United States Patent
Lin

(10) Patent No.: US 8,456,512 B2
(45) Date of Patent: Jun. 4, 2013

(54) ELECTRONIC DEVICE FOR CAPTURING PANORAMIC IMAGES

(75) Inventor: Chih-Hua Lin, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 351 days.

(21) Appl. No.: 12/862,771

(22) Filed: Aug. 25, 2010

(65) Prior Publication Data

US 2011/0149015 A1    Jun. 23, 2011

(30) Foreign Application Priority Data

Dec. 18, 2009    (CN) .......................... 2009 1 0311783

(51) Int. Cl.
*H04N 7/00* (2011.01)

(52) U.S. Cl.
USPC .................. 348/36; 348/37; 348/38; 348/39; 348/113; 348/143; 348/148; 348/159

(58) Field of Classification Search
USPC ...................... 348/36–39, 113, 143, 148, 159
See application file for complete search history.

(56) References Cited

U.S. PATENT DOCUMENTS

| 5,867,317 | A | * | 2/1999 | Elie et al. ........................ 359/555 |
| 5,959,622 | A | * | 9/1999 | Greer et al. ..................... 715/719 |
| 6,377,294 | B2 | * | 4/2002 | Toyofuku et al. ............... 348/36 |

\* cited by examiner

*Primary Examiner* — Sath V Perungavoor
*Assistant Examiner* — Geepy Pe
(74) *Attorney, Agent, or Firm* — Altis Law Group, Inc.

(57) ABSTRACT

An electronic device and a method enable capturing a 360° panoramic image by a digital camera having a fixed angle lens. A number of frames is set for capturing the 360° panoramic image of the digital camera unit. The electronic device receives an initial azimuth of the digital camera unit from an electronic compass and determines rotation points of the digital camera unit. A current azimuth from an electronic compass of the electronic device is received and the rotated angle of the digital camera unit is calculated. The electronic device captures at least one image if the digital camera unit rotates to one of the rotation points.

14 Claims, 3 Drawing Sheets

ELECTRONIC DEVICE FOR CAPTURING PANORAMIC IMAGES

BACKGROUND

1. Technical Field

Embodiments of the present disclosure relate to image capture, and more particularly to a device and method for capturing a 360° panoramic image.

2. Description of Related Art

Electronic devices equipped with a digital camera provide only a small fixed viewing angle for capturing images. Capture of a 360° panoramic image is not possible in many such devices. Thus, some digital cameras have been developed to capture multiple images and combine the captured images into one panoramic image by processing application. However, the repeated image capture required can be inconvenient and less than precise.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
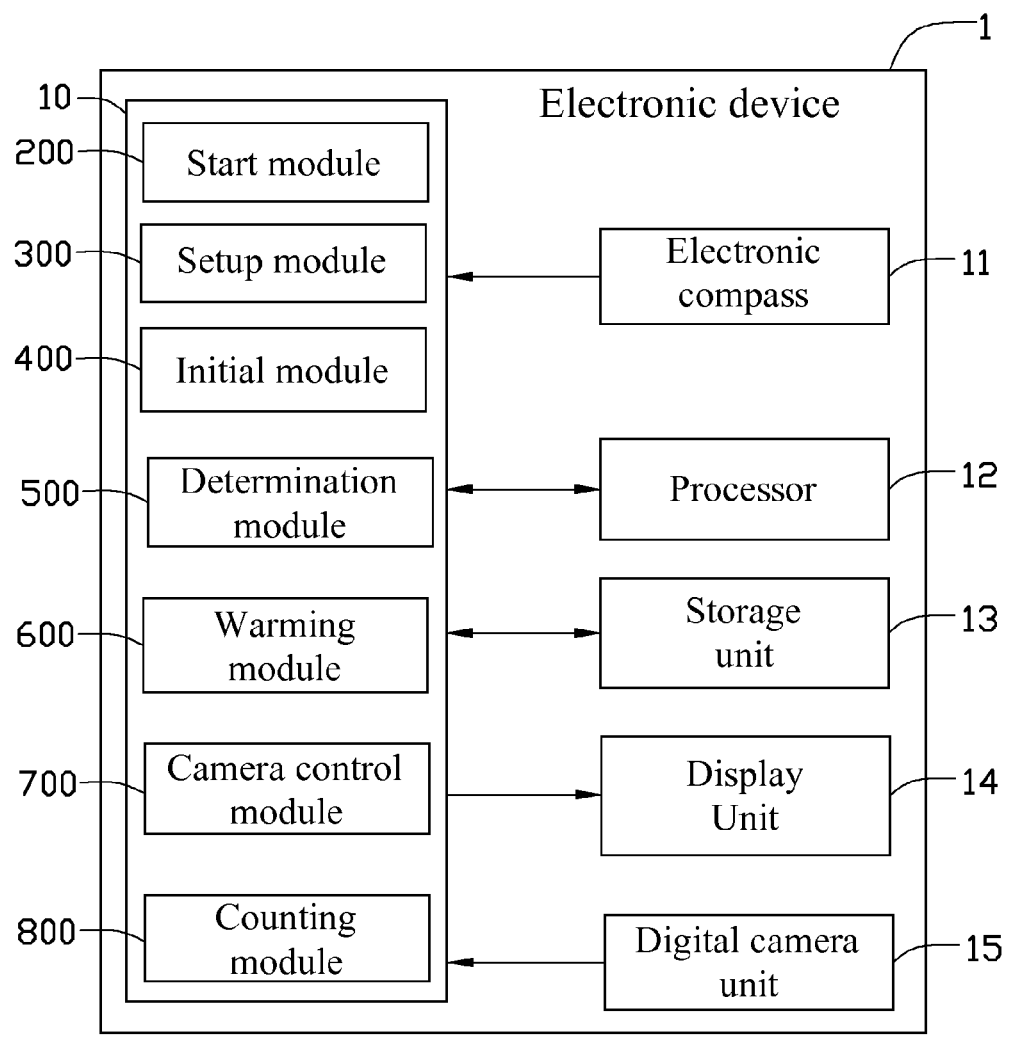
FIG. 1 is a block diagram of one embodiment of an electronic device for capturing a 360° panoramic image.

FIG. 1 is a block diagram of one embodiment of an electronic device 1. The electronic device 1 is capable of capturing of a 360° panoramic image. Depending on the embodiment, the device can be a mobile phone, a notebook computer, or a personal digital assistant (PDA). The electronic device 1 includes a system 10, an electronic compass 11, at least one processor 12, a storage unit 13, a display unit 14 and a digital camera unit 15. The system 10 includes programs including a start module 200, a setup module 300, an initial module 400, a determination module 500, a warning module 600, a camera control module 700, and a count module 800.

The electronic device 1 is generally controlled and coordinated by operating system software, such as the UNIX, Linux, Windows 95, 98, NT, 2000, XP, Vista, Mac OS X, an embedded operating system, or any other compatible operating systems. In other embodiments, the electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The electronic compass 11 is operable to detect an azimuth of the digital camera unit 15 of the electronic device 1. For example, the electronic compass 11 detects the current azimuth of a lens of the digital camera unit 15 at of the moment when the digital camera unit 15 captures an image.

The at least one processor 12 may execute one or more programs stored in the storage unit 13 to provide functions for the start module 200, the setup module 300, the initial module 400, the determination module 500, the warming module 600, the camera control module 700, and the counting module 800. The at least one processor 12, as an example, may include a CPU, math coprocessor, or shift register.

The storage unit 13 is electronically connected to the electronic compass 11, the least one processor 12, the display unit 14, the digital camera unit 15 and the system 10. The storage unit 13 is operable to store many kinds of data, such as the captured images, the azimuth information, a customization function code of the electronic device 1, computerized codes of the system 10, programs of an operating system and other applications of the electronic device 1. The storage unit 13 may include a hard disk drive, flash memory, RAM, ROM, cache, or external storage mediums.

The display unit 14 displays information related to the captured image, for example the azimuth information of the electronic device 1 and the captured images by the digital camera unit 15. The display unit 14 can be a display screen, a resistive touch screen, or a capacitive touch screen.

The digital camera unit 15 is operable to capture images and send the captured images to the storage unit 13.

The start module 200 is operable to determine whether to capture a 360° panoramic image by the digital camera unit 15. In one embodiment, the start module 200 activates a 360° panoramic image function of the electronic device 1 in response to a user activating a corresponding function of the electronic device 1. The 360° panoramic image function is used to combine several fixed angle captured images into one 360° panoramic image using the processor 12. In one embodiment, the start module 200 is connected to a hotkey installed in the electronic device 1. If a user pushes the hotkey, the start module 200 actives the 360° panoramic image function of the electronic device 1.

The setup module 300 is operable to set a number of frames required for capture to the digital camera unit 15 to achieve the 360° panoramic image. If no number is set by the setup module 300, a default number of frames for capture of the 360° panoramic image is selected. In one embodiment, the default number of frames for capturing the 360° panoramic image can be determined by calculating a maximum angle of the lens of the digital camera unit 15. For example, if the maximum angle of the lens configured in the digital camera unit 15 is 120°, the default number of frames is set to three, given that 360 °/120°=3. If the result is not integer divisible, the result is an unconditional decimal integer. For example, the maximum angle of another lens configured in the digital camera unit 15 is 100°, the default number is set to four. (360° divided by 100° equals 3.6, so the unconditional decimal integer of 3.6 is integer 4.) Accordingly, the maximum angle of the lens is obtained from the manufacture information of the lens.

Figure 3:
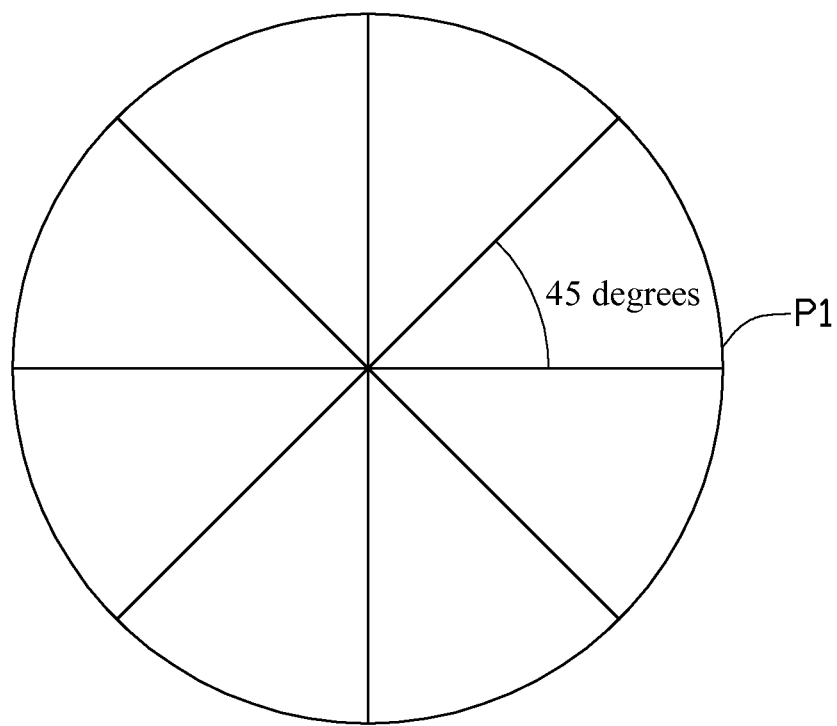
FIG. 3 is a schematic diagram of the electronic device of FIG. 1 capturing a 360° panoramic image.

The initial module 400 is operable to receive an initial azimuth of the digital camera unit 15 from the electronic compass 11. In addition, the initial module 400 is operable to determine a plurality of rotation points of the digital camera unit 15 by calculating from the set number of frames and the initial azimuth of the digital camera unit 15. FIG. 3 is a schematic diagram of the electronic device 1 of FIG. 1 capturing a 360° panoramic image. In one embodiment, if the number of frames is set to 8, after obtaining a step of rotation angle of 45°. (360° divided by 8 equals 45°.) As shown in FIG. 3, if the initial azimuth of the digital camera unit 15 installed in the electronic device 1 is P1, k the digital camera unit 15 starts to capture at P1 and captures a 360° panoramic image by 8 rotation points which varies in a 45° step.

The determination module 500 is operable to receive a current azimuth of the digital camera unit 15 from the electronic compass 11 and calculate a rotated angle of the digital camera unit 15. The rotated angle of the digital camera unit 15 is calculated by the current azimuth minus the initial azimuth of the digital camera unit 15. For example, if the initial azimuth is 45° and the current azimuth is 95°, the rotated angle of the digital camera unit 15 is 50°. In addition, the determination module 500 determines whether the digital camera unit 15 rotates to one of the rotation points by calculated rotated angle of the digital camera unit 15.

The warning module 600 outputs a message to capture one image in response to detecting that the digital camera unit 15 rotates to one of the rotation points. For example, the message can be an audio signal or a vibration.

The camera control module 700 directs the digital camera unit 15 to capture at least one image if rotated to one of the rotation points. In one embodiment, the camera control module 700 directs the digital camera unit 15 to capture one more image at the same azimuth if the first captured image is unclear.

The counting module 800 calculates a capture time of the digital camera unit 15 and determines whether the capture time equals the set number of frames for the 360° panoramic image. The counting module 800 issues a stop capture signal to the camera control module 700 when the capture time equals the set number of frames for the 360° panoramic image.

Figure 2:
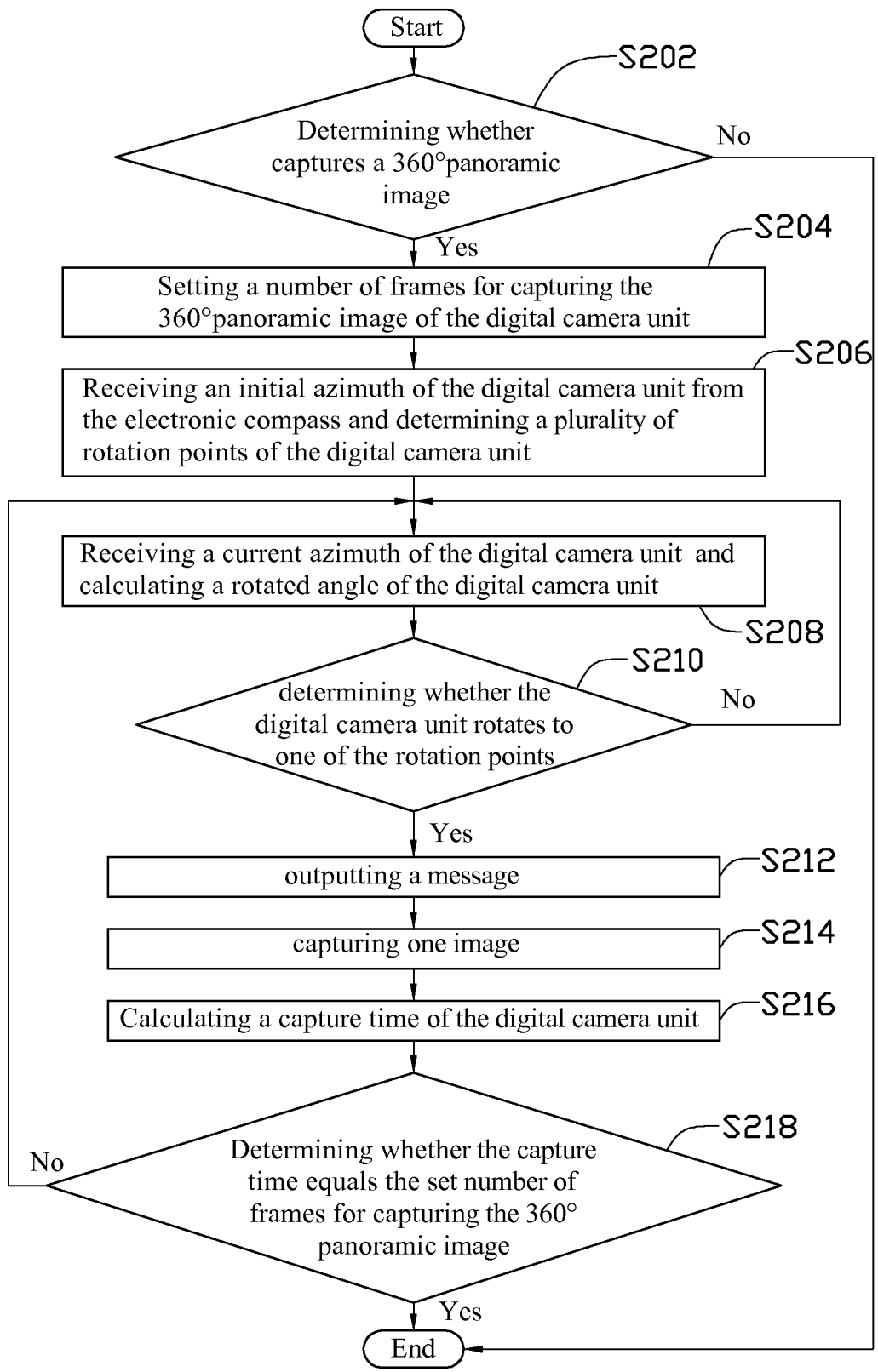
FIG. 2 is a flowchart illustrating one embodiment of a method of capturing a 360° panoramic image using an electronic device.

FIG. 2 is a flowchart illustrating one embodiment of a method of capturing a 360° panoramic image using an electronic device, such an electronic device 1. Depending on the embodiment, additional blocks may be added, others deleted, and the ordering of the blocks may be changed.

In block S202, a start module 200 determines whether to capture a 360° panoramic image by the digital camera unit 15. In one embodiment, the start module 200 determines whether a signal to capture a 360° panoramic image from the electronic device 1 has been received. If the signal to capture a 360° panoramic image is received, block S204 is implemented. Otherwise, if no signal to capture the 360° panoramic image, a general procedure for image capturing is processed.

In block S204, a number of frames required for capture to the digital camera unit 15 to provide a 360° panoramic image function is set. If no number of frames is set, a default number of frames for capturing the 360° panoramic image is selected. In one embodiment, the default number of frames for capturing the 360° panoramic image is determined by calculating by a maximum angle for a lens of the digital camera unit 15. For example, if the maximum angle of the lens configured in the digital camera unit 15 is 90°, the default number is set to four. (360°/90°=4.) If the result is not integer divisible, the result is an unconditional decimal integer. For example, if the maximum angle of another lens configured in the digital camera unit 15 is 100°, the default number is set to four. (360°/100°=3.6, so the unconditional decimal integer of 3.6 is integer 4), in which the maximum angle of the lens is obtained from the manufacture information of the lens.

In block S206, an initial azimuth of the digital camera unit 15 from the electronic compass 11 is received and a plurality of rotation points of the digital camera unit 15 is determined. In one embodiment, determination of the rotation points is done by calculating from the set number of frames and the initial azimuth of the digital camera unit 15. For example, if the number of frames is set to 6, the step of rotation angle is calculated by 360° divided by 6 equaling to 60°. Then, the digital camera unit 15 starts to capture at a starting azimuth and captures images by each rotation points which varies in a 60° step.

In block S208, a current azimuth of the digital camera unit 15 from the electronic compass 11 is received and a rotated angle of the digital camera unit 15 is calculated, where the rotated angle of the digital camera unit 15 is calculated by the current azimuth minus the initial azimuth of the digital camera unit 15.

In block S210, a determination as to whether the digital camera unit 15 rotates to one of the rotation points is made. If the digital camera unit 15 rotates to one of the rotation points, block S212 is implemented. Otherwise, if the digital camera unit 15 does not rotate to one of the rotation points, block S208 is implemented.

In block S212, a message to capture one image is output. In one embodiment, the message can be an audio signal or a vibration.

In block S214, a camera control module 700 directs the digital camera unit 15 to capture one image. In one embodiment, the camera control module 700 directs the digital camera unit 15 to capture at least one image at the same azimuth if the first captured image is unclear.

In block S216, counting module 800 calculates a capture time of the digital camera unit 15.

In block S218, the counting module 800 determines whether the capture time equals the set number of frames for capturing the 360° panoramic image. If the capture time equals the set number of frames, the process is complete. Otherwise, if the capture time does not equal the set number of frames, block S208 is implemented.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a storage unit;
   a display unit;
   at least one processor;
   a digital camera unit;
   an electric compass to detect an azimuth of the digital camera unit of the electronic device;
   one or more programs stored in the storage unit and being executable by the at least one processor;
   a setup module to set a number of frames for capturing a 360° panoramic image of the digital camera unit;
   an initial module to receive an initial azimuth of the digital camera unit from the electronic compass, determine a step of rotation angle of the digital camera unit according to the number of frames, and determine rotation points of the digital camera unit according to the initial azimuth and the step of rotation angle of the digital camera unit for capturing the number of frames to generate the 360° panoramic image;
   a determination module to calculate a rotated angle of the digital camera unit according to a current azimuth of the digital camera unit and the initial azimuth of the digital camera unit and determine whether the digital camera unit rotates to one of the rotation points according to the rotated angle; and a camera control module to capture at least one image if the digital camera unit rotates to one of the rotation points.

2. The electronic device of claim 1, wherein the setup module is further operable to determine a default number of frames for capturing the 360° panoramic image if no number of frames for capturing the 360° panoramic image is set.

3. The electronic device of claim 2, wherein the default number of frames is determined according to a maximum angle for a lens of the digital camera unit.

4. The electronic device of claim 1, wherein the electronic device further comprises a warning module to output a message to capture at least one image upon detecting that the digital camera unit rotates to one of the rotation points.

5. A method for capturing a 360° panoramic image by an electronic device, the electronic device comprising an electronic compass and a digital camera unit, the method comprising:

setting a number of frames for capturing the 360° panoramic image using the digital camera unit;

receiving an initial azimuth of the digital camera unit from the electronic compass, and determining a step of rotation angle of the digital camera unit according to the number of frames, and determine rotation points of the digital camera unit according to the initial azimuth and the step of rotation angle of the digital camera unit for capturing the set number of frames;

receiving a current azimuth of the digital camera unit from the electronic compass and calculating a rotated angle of the digital camera unit according to the current azimuth and the initial azimuth of the digital camera unit;

determining whether the digital camera unit rotates to one of the rotation points according to the rotated angle; and capturing at least one image if the digital camera unit rotates to one of the rotation points.

6. The method of claim 5, further comprising:

determining whether a number of captured frames equals the set number of frames for capturing the 360° panoramic image; and receiving the current azimuth of digital camera unit from the electronic compass and calculating the rotated angle of digital camera unit if the number of captured frames is not equal to the set number.

7. The method of claim 5, further comprising:

reading a default number of frames for capturing the panoramic image of the digital camera unit if no number of frames for capture is set.

8. The method of claim 7, wherein the default number of frames is determined according to a maximum angle for a lens of the digital camera unit.

9. The method of claim 6, further comprising:

outputting a message to capture at least one image upon detecting that the digital camera unit rotates to one of the rotation points.

10. A non-transitory storage medium having stored thereon instructions that, when executed by a processor, causes the processor to perform a method of capturing a 360° panoramic image by an electronic device, the electronic device comprising an electronic compass and a digital camera unit, the method comprising:

setting a number of frames for capturing the 360° panoramic image using the digital camera unit;

receiving an initial azimuth of the digital camera unit from the electronic compass and determining a step of rotation angle of the digital camera unit according to the number of frames, and determine rotation points of the digital camera unit according to the initial azimuth and the step of rotation angle of the digital camera unit for capturing the set number of frames;

receiving a current azimuth of the digital camera unit from the electronic compass and calculating a rotated angle of the digital camera unit according to the current azimuth and the initial azimuth of the digital camera unit;

receiving the rotated angle and determining whether the digital camera unit rotates to one of the rotation points according to the rotated angle; and capturing at least one image if the digital camera unit rotates to one of the rotation points.

11. The non-transitory storage medium of claim 10, the method further comprising:

determining whether a number of captured frames equals the set number of frames for capturing the 360° panoramic image; and receiving the current azimuth of digital camera unit from the electronic compass and calculating the rotated angle of digital camera unit if the number of captured frames is not equal to the set number.

12. The non-transitory storage medium of claim 10, the method further comprising:

reading a default number of frames for capturing the panoramic image of the digital camera unit if no number of frames for capture is set.

13. The non-transitory storage medium of claim 12, wherein the default number of frames is determined according to a maximum angle for a lens of the digital camera unit.

14. The non-transitory storage medium of claim 11, the method further comprising:

outputting a message to capture at least one image upon detecting that the digital camera unit rotates to one of the rotation points.

* * * * *